(No Model.)

S. P. & E. WINDSOR.
SPREADER FOR DRAFT CHAINS.

No. 428,708. Patented May 27, 1890.

Witnesses
Harry S. Rohrer
Wallace Greene

Inventors
Sterling Price Windsor
Ewell Windsor
By their Attorney
John A. Blevins

THE NORRIS PETERS CO., PHOTO-LITHO., WASHINGTON, D. C.

UNITED STATES PATENT OFFICE.

STERLING PRICE WINDSOR AND EWELL WINDSOR, OF MADISON, CALIFORNIA.

SPREADER FOR DRAFT-CHAINS.

SPECIFICATION forming part of Letters Patent No. 428,708, dated May 27, 1890.

Application filed July 25, 1889. Serial No. 318,613. (No model.)

*To all whom it may concern:*

Be it known that we, STERLING PRICE WINDSOR and EWELL WINDSOR, citizens of the United States, residing at Madison, in the county of Yolo, State of California, have invented certain new and useful Improvements in Spreaders for Draft-Chains; and we do hereby declare the following to be a full, clear, and exact description of the invention, such as will enable others skilled in the art to which it appertains to make and use the same.

Our said invention relates to improvements in spreaders for draft-chains, which are used when several teams are employed in drawing heavy loads; and it consists of a hollow spreader-bar provided with removable heads formed in two parts or members mounted in the ends of the spreader-bar and adapted to engage the draft-chain.

The object of the invention is to form a spreader-bar which may be readily and easily attached to draft-chains to provide a fastening which will dispense with the use of pins or bolts as a means of attachment, which fastening is so constructed that it will not widen or stretch the links of the chain, and when attached will not project beyond said links.

The particular construction, arrangement, and combination of the various parts of our invention we will now proceed to point out and describe, reference being had to the accompanying drawings, in which—

Figure 1:
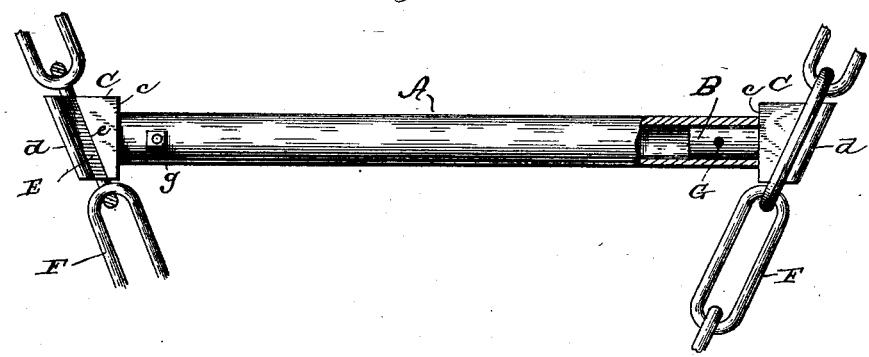
Figure 2:
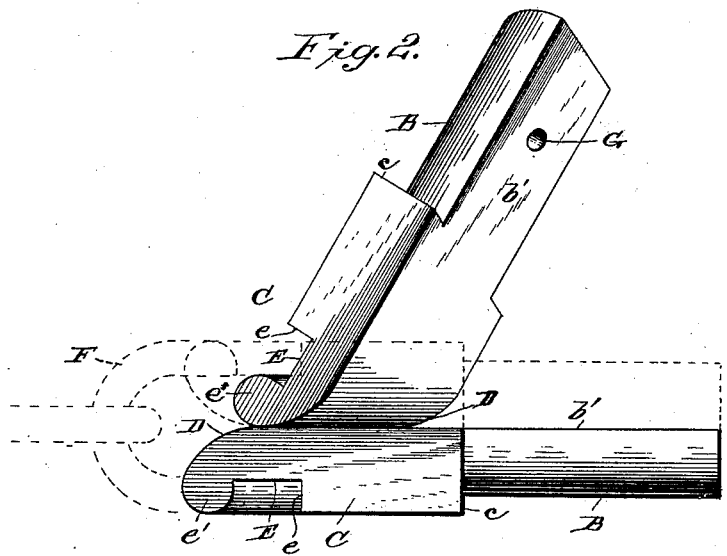

Figure 1 is a plan view showing the spreader attached to a draft-chain, one end of the spreader-bar being in section. Fig. 2 is an enlarged detail of the device employed for attaching the spreader-bar to the chain, illustrating the manner in which the fastening is attached to a link of the chain.

Referring to said drawings, A represents a hollow, and preferably cylindrical, spreader-bar formed of any ordinary piping or metal tube. In each end of the spreader-bar is mounted a split shank or rod composed of two similarly-shaped members or parts B B, having flat meeting surfaces $b$ $b$, said shank when united conforming in cross-section to the cross-section of the aperture or bore of the spreader-bar, so as to fit snugly therein. Each member or part of the shank is provided with an enlarged head C, having shoulders $c$, adapted to rest against the ends of the spreader-bar. The inner or meeting faces of said heads have outwardly curved or beveled ends D diverging from each other, the extreme ends $d$ of said head being cut away in a diagonal line to the longitudinal center line of the head and its shank. E are diagonal grooves in the outer faces of said heads, with which the links of the draft-chain engage. Said grooves are parallel with the diagonal ends of the heads and are formed with rectangular inner walls $e$, against which the links bear. The outer walls of the grooves and the edges of the diagonal ends of the heads are rounded, forming a substantially round rib $e'$ at the extreme ends of said heads, conforming in shape to the shape of the link in cross-section. The grooves are of sufficient depth to permit the link to rest therein and not project above the faces of the heads. The diagonal ends of the heads are so arranged when the spreader is attached to the chain that said heads will not project beyond the outer line of the next links.

F represents the draft-chain, showing that portion which is attached to the spreader. Ordinarily the tension of the chain is sufficient to hold the shanks and heads in place; but we also provide the shanks with holes G, in which a bolt or pin $g$ mounted in the spreader-bar engages. This bolt may be used when needed.

To attach our spreader-bar to a draft-chain, the heads are first removed and their curved ends brought together, as shown in Fig. 2, and inserted within a link of the chain. The members of the shanks of the heads are then drawn together, causing the opposite sides of the link to engage with the diagonal grooves in the outer faces of said heads. Said shanks are then inserted in the ends of the hollow spreader-bar, and are held in place by the tension of the draft-chain, or may, if desired, be secured by bolts or pins, above referred to.

Having thus fully described our invention, we claim as new and desire to secure by Letters Patent—

1. A spreader-bar for draft-chains having apertures in its outer ends, in combination with removable heads secured in said apertures and adapted to engage the draft-chain, substantially as shown and described.

2. A spreader-bar for draft-chains having apertures in its outer ends, in combination with removable heads formed in two members and adapted to be secured in said apertures and engage the draft-chain, substantially as shown and described.

3. A spreader-bar for draft-chains having apertures in its outer ends, in combination with split shanks mounted in said apertures and provided with heads having their inner or meeting faces outwardly and divergingly curved, and provided on their outer faces with diagonal grooves adapted to receive the links of the draft-chain, substantially as shown and described.

4. A spreader-bar for draft-chains having apertures in its outer ends, in combination with split shanks mounted in said apertures having enlarged heads, the inner or meeting faces of which are outwardly and divergingly curved and provided with diagonal ends and diagonal grooves in their outer faces adapted to receive the links of the draft-chain, substantially as shown and described.

5. The combination, with the hollow spreader-bar A, of the split shanks formed in two members B B, having enlarged heads C, provided with shoulders $c$, and having their inner or meeting faces outwardly curved at D, and provided with diagonal grooves E in the outer faces of said heads, substantially as shown and described.

In testimony that we claim the foregoing as our own we have hereto affixed our signatures, in the presence of two witnesses, this 6th day of July, 1889.

STERLING PRICE WINDSOR.
   EWELL WINDSOR.

Witnesses:
 AUGUST DAHLER,
 MARSHALL DIGGS.